Figure 1:
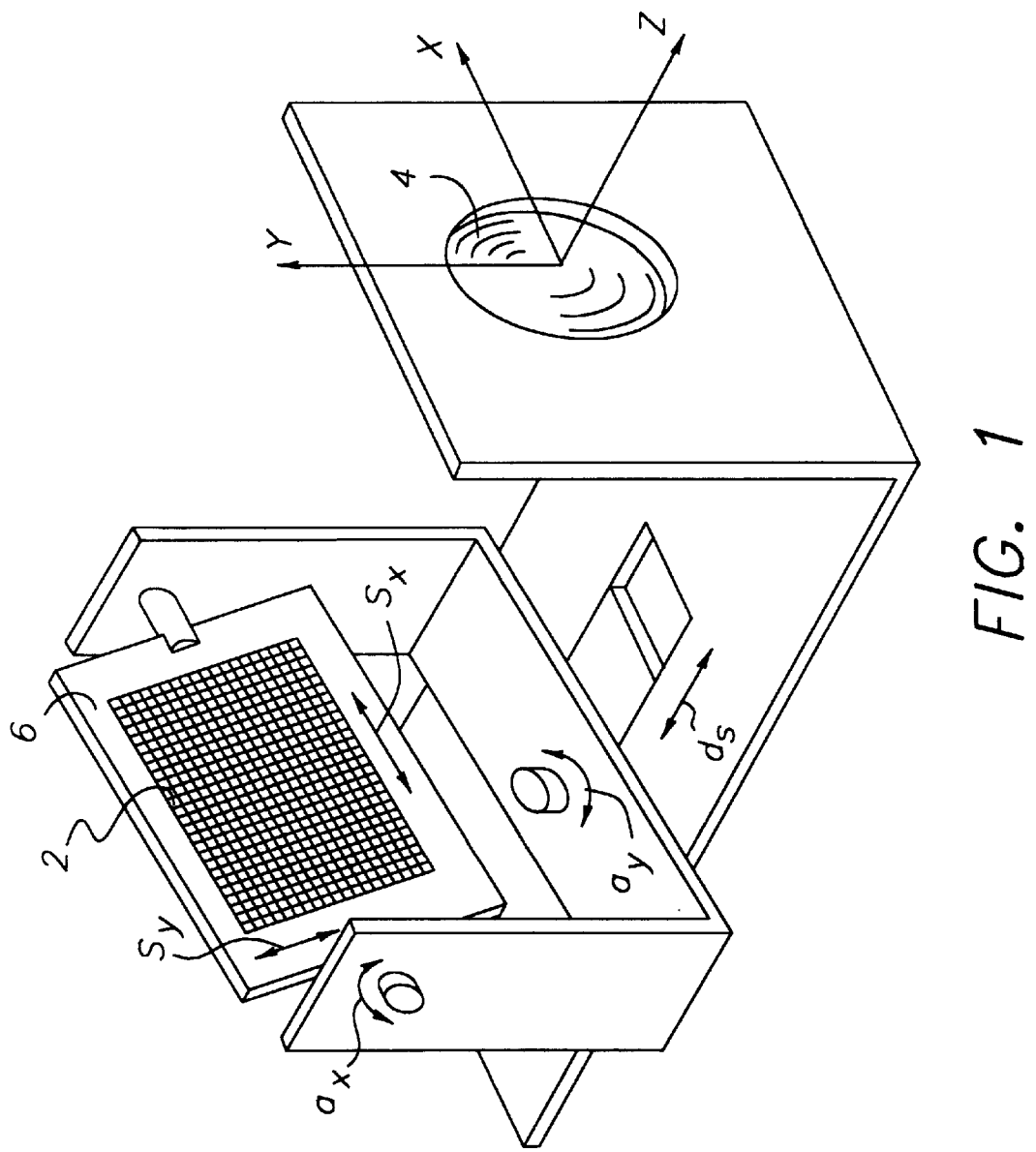

United States Patent [19]

Mutze

[11] Patent Number: 6,072,529
[45] Date of Patent: *Jun. 6, 2000

[54] ELECTRONIC CAMERA FOR THE REALIZATION OF THE IMAGING PROPERTIES OF A STUDIO BELLOW CAMERA

[75] Inventor: Ulrich Mutze, Bad Ditzenbach, Germany

[73] Assignee: Eastman Kodak Company, Rochester, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/866,274
[22] Filed: May 30, 1997

[30] Foreign Application Priority Data

Sep. 16, 1996 [DE] Germany .............. 196 37 629

[51] Int. Cl.$^7$ .................................................. H04N 5/232
[52] U.S. Cl. .......................... 348/351; 348/348; 348/357
[58] Field of Search .................................. 348/208, 207, 348/218, 219, 239, 348, 351, 112, 345, 346, 349, 357; H04N 5/225

[56] References Cited

U.S. PATENT DOCUMENTS 5,067,020  11/1991  Funston ................................... 348/112
5,453,784   9/1995  Krishman et al. ...................... 348/348

Primary Examiner—Tuan Ho
Attorney, Agent, or Firm—David M. Woods

[57] ABSTRACT

An electronic camera comprises a lens for imaging an object on an image plane. At least one object area is selected, and a microcomputer calculates the displacement parameters needed to achieve sharp focusing of the selected object area. An image sensor is provided in the image plane of the camera which is moveable in five degrees of freedom. A positioning structure automatically moves the image sensor in response to displacement parameters calculated by the microcomputer so that a sharply focused image of the selected object area is obtained in the image plane.

7 Claims, 3 Drawing Sheets

ELECTRONIC CAMERA FOR THE REALIZATION OF THE IMAGING PROPERTIES OF A STUDIO BELLOW CAMERA

FIELD OF THE INVENTION

The invention relates to an electronic camera comprising a lens for imaging an object on an image plane, means for selecting at least one object area, and computing means for calculating the displacement parameters needed to achieve sharp focusing of the selected object area.

BACKGROUND OF THE INVENTION

Patent specification DE-C-34 33 412 discloses a means for calculating the optimum settings for the adjustable lens and image carriers of a photographic camera. The camera is so designed that three points of an object can be focused on the photographic image. According to the Scheimpflug condition, the aim is to achieve sharp imaging of the points of the object For this purposes, the three different points of the object are brought into sharp focus one after another and the corresponding values are delivered via a keyboard to a computer which then calculates and displays the correct setting of the camera in accordance with the Scheimpflug condition. In other embodiments of the camera, sensor elements are provided which calculate the sharpness of the selected image point. In addition, motors are provided which automatically bring the lens and image carrier to the desired position.

The international patent application WO 91/10157 describes a device and a process for focusing a photographic camera. The lens and image plane are pivotably arranged in relation to one another so that the camera can be set to positions which meet the Scheimpflug condition. To this end, the user selects two points of the object which are to be sharply imaged. The distance of these points to the horizontal axis of symmetry of the image plane is measured and the data fed to a computer which then calculates the values of the settings for the lens and the image plane.

In order to give a small camera the imaging properties of a studio camera, a number of lenses are available where the lens system can be moved parallel to the image plane (see the article "Tilt and Shift"; FOTO magazine, February, 1996, pages 44 to 49). The lenses are extremely expensive and automatic setting to obtain optimum focusing of an object area is not possible.

SUMMARY OF THE INVENTION

The object of the present invention is to provide an electronic camera which has imaging properties comparable to those of a studio bellow camera. The camera is furthermore so designed that imaging is automatically performed.

This is achieved in accordance with the present invention in that the image plane of the camera is provided with an image sensor which can be moved in five degrees of freedom, and in that positioning means are provided for moving said image sensor, said positioning means being automatically actuatable on the basis of the displacement parameters calculated by the computer; so that a focused image of the selected object area is obtainable.

The advantage of the electronic camera in accordance with the present invention is that the user can select a particular object are which can be brought into sharp focus at the image plane. For this purpose, an electronic camera is used having an image sensor in its image plane, the size of said sensor corresponding to the conventional 35 mm film format. Using a lens, an object is focused on the image plane. In addition, means are provided for selecting at least one object area as well as computing means for calculating the displacement parameters. In this way, the selected object area is sharply imaged. The image sensor provided in the image plane of the camera can be moved in five degrees of freedom. The positioning means automatically move the image sensor in accordance with the displacement parameters calculated by the computing means; as a result, the selected object area can be brought into sharp focus in the image plane. The five degrees of freedom of the image sensor comprise an axial displacement ds along the optical axis of the lens, a horizontal displacement s1 parallel to the x direction, a vertical displacement $s_y$ parallel to the y direction, a horizontal inclination $a_x$ relative to the x-y plane and a vertical inclination $a_y$ relative to the x-y plane.

Further advantageous features of the present invention are described in the subclaims.

BRIEF DESCRIPTION OF THE DRAWINGS

The subject matter of the present invention will now be described with reference to an embodiment illustrated in the drawing wherein:

FIG. 1 represents a schematic view of an image sensor which can be moved in five degrees of freedom;

FIG. 2 shows a schematic view of the device for performing axial displacement and horizontal and vertical inclination and FIG. 3 depicts an embodiment for achieving horizontal and vertical displacement.

DETAILED DESCRIPTION OF THE INVENTION

A camera is called a 5-D camera when the film holder can be moved through five degrees of freedom. FIG. 1 shows a schematic representation of a 5-D camera in which an image sensor 2, provided in lieu of a film, is movably mounted so that the imaging properties of a studio bellow camera can be achieved. Image sensor 2 is secured in a suitable holding device 6.

The camera has a stationary optical lens 4 or a stationary optical lens system. The center of the lens provides the basis for a Cartesian coordinate system (X,Y,Z) which can be used to describe the degrees of freedom of the image sensor. The Z-axis of the coordinate system is parallel to the axis of the lens. The X-axis and the Y-axis define an object plane. Image sensor 2 can be moved relative to this plane. Image sensor 2 is built up of n elements in the X-direction and of m elements in the Y-direction. The size of the image sensor corresponds for example to a conventional 35 mm film format. It is likewise conceivable that the size of the image sensor can correspond to the format of the new Advanced Photo System.

Image sensor 2 itself can be moved in five degrees of freedom ds, $s_x$, $s_y$, $a_x$ and $a_y$. The parameter ds determines the axial movement of image sensor 2. The parameters $s_x$ and $s_y$ define the horizontal and vertical displacement respectively of image sensor 2. Parameters $a_x$ and $a_y$ represent the degrees of freedom for the horizontal inclination and the vertical inclination respectively of the image sensor 2. It is obvious that the number of degrees of freedom cannot be further reduced without having a detrimental effect on the operation of the camera.

An electronic camera equipped with such a movable image sensor is so designed that all movable elements (positioning means, actuating devices) are arranged within the camera housing (not illustrated). Electromechanical devices (not shown) produce movement of image sensor 2, and movement is regulated by a micro-computer (not shown) provided in the camera.

The electromechanical actuating devices need only make small movements to fulfill the Scheimpflug condition. Modification of the Scheimpflug condition for a special situation makes this easier to understand. Let us assume that the optical axis intersects the inclined object plane at point P and the camera brings this point P into sharp focus. (In most cases, this point will lie in the center of the object; however, this point can be somewhere else from where it is not possible to bring it into sharp focus). The imaging of an object at the distance of point P determines an enlargement m (m is normally smaller than one, m=f/x wherein f=focal length and x=the axial distance of the object to the focal point $F_1$). This enlargement m directly defines the inclination of the image plane.

$$\tan(a') = m \tan(a)$$

wherein a=the angle of inclination to the plane of the object, and $$a' = \text{the angle of inclination to the relevant image plane.}$$

The smaller the film format of a camera, the smaller m can be in order to image a particular scene on the film format. As a result, the angle of inclination a' becomes smaller when the inclination of the object plane is fixed. If the image sensor is inclined in this plane, then a sharp image is obtained for the entire surface. In the case of image sensors for small film sizes, it is possible to obtain a good image under most imaging conditions using angles of inclination of approximately 1°. A studio camera can only achieve such image quality when an angle of inclination of approximately 20° is used.

The axial displacement ds, the horizontal displacement $a_x$ and $a_y$ can be obtained by the installation of support means 6 for image sensor 2. Three holes, 8a, 8b and 8c are drilled in support means 6 which are intended to accommodate adjustment screws 10a, 10b and 10c. The three holes 8a, 8b and 8c are so distributed over the mounting plate that they form an equal-sided or equilateral triangle. Drill hole 8b is to be found on the vertical symmetry axis VS of support means 6.

Figure 2:
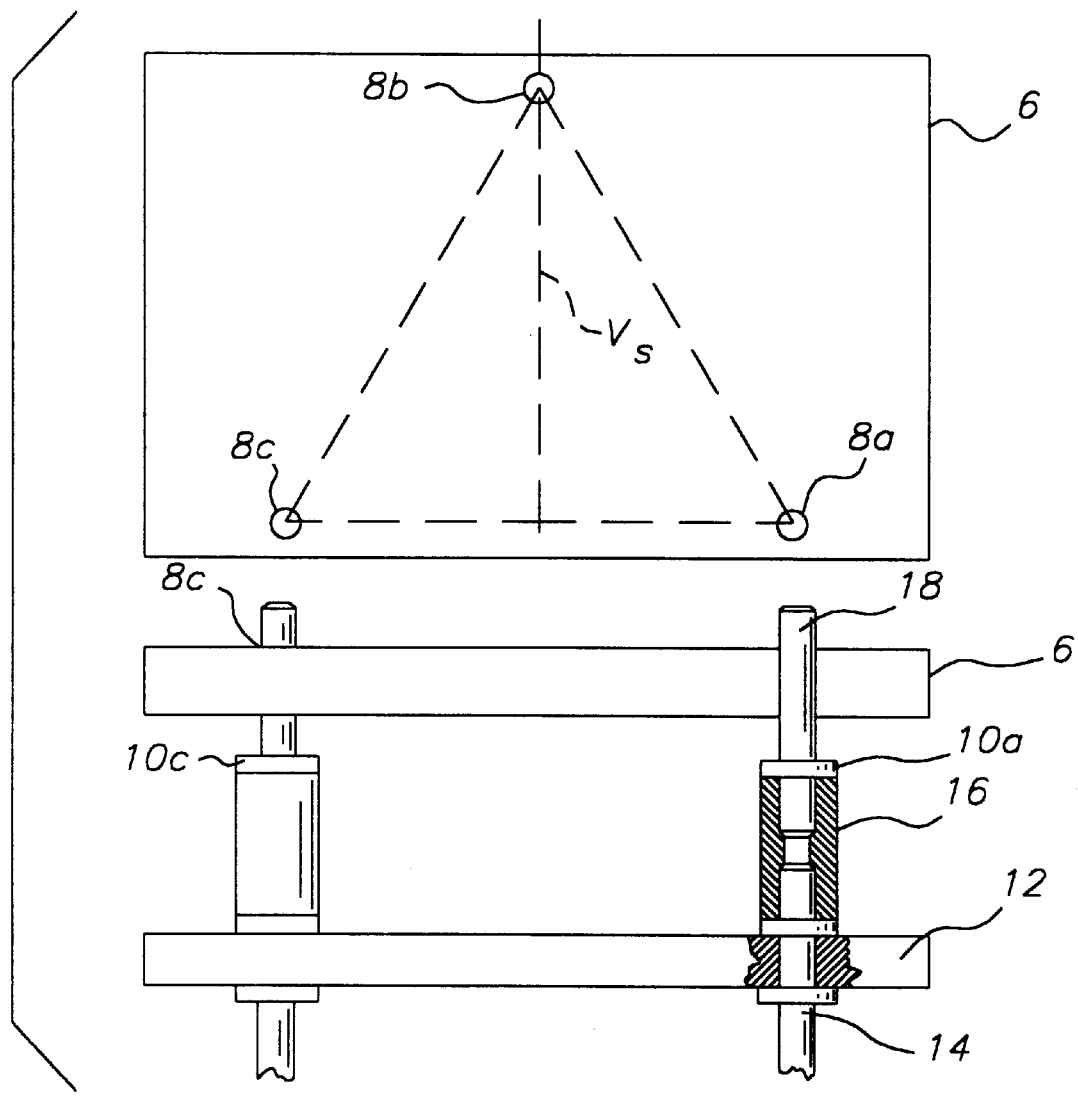

Adjustment screws 10a, 10b and 10c (FIG. 2 only shows adjustment screws 10a and 10c) are rotatably mounted in camera housing 12. They are guided in the camera housing in such a way that actuating element 14 of each adjustment screw 10a, 10b and 10c protrudes through the side of the camera housing opposite to support means 6. The end of actuating device 14 facing support means 6 lies in a flexible hollow body 16. The other end of hollow body 16 contains thread 18 of adjustment screws 10a, 10b or 10c. This section of the thread can connect with the thread of drill holes 8a, 8b or 8c of support means 6. Rotation of adjustment screws 10a, 10b and 10c effects the above-mentioned adjustment of support means 6 and of image sensor 2, respectively.

Figure 3:
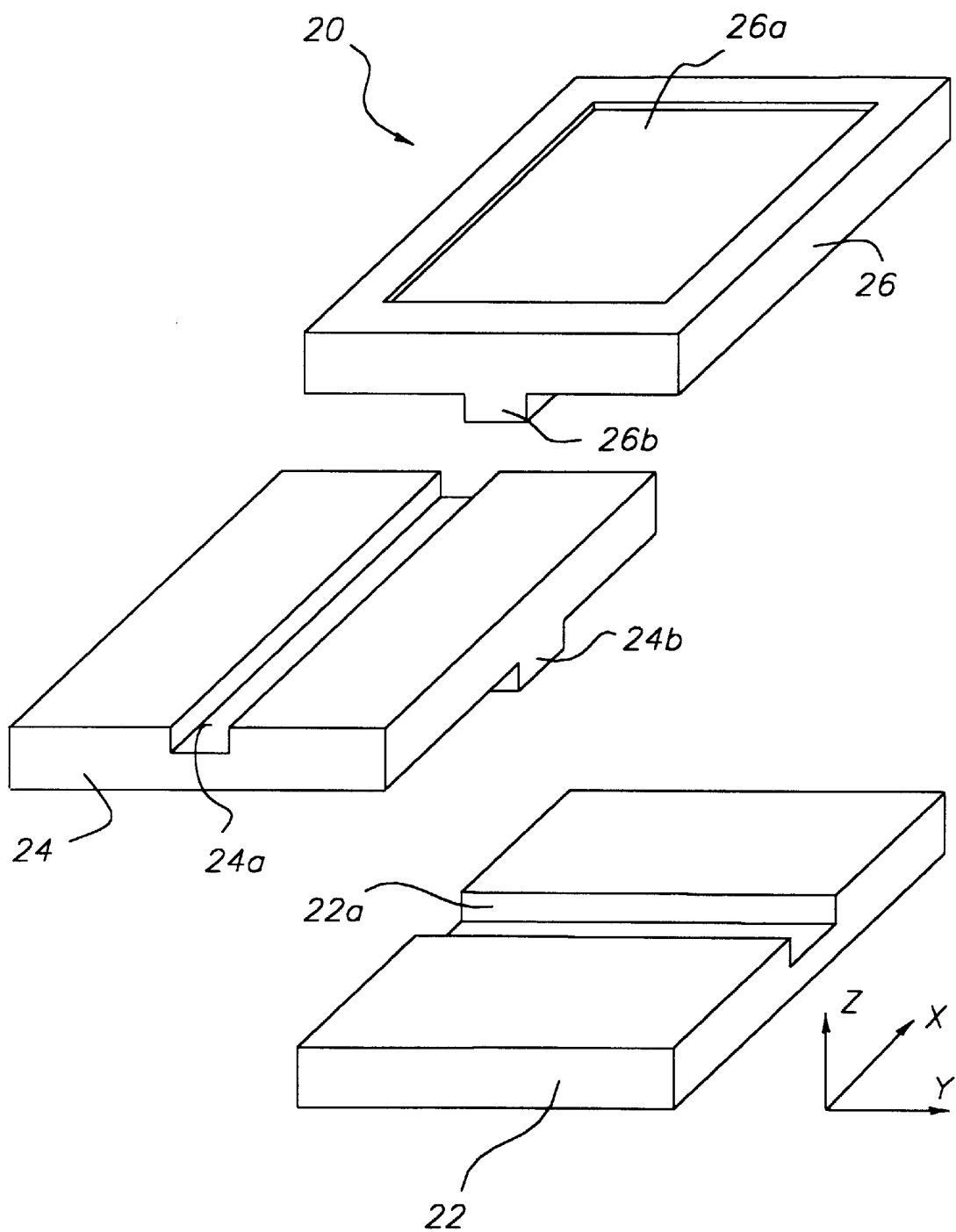

A mounting 20 for the horizontal and vertical displacement $s_x$ and $s_y$ is shown in FIG. 3. A fixed platform 22 is mounted on support means 6. In this way, displacement ds and inclination $a_x$ and/or $a_y$ can be transferred to platform 22. Said platform 22 has a groove 22a which runs in the y-direction. Groove 22a guides a first carriage 24 which has a tongue 24b in the y-direction which fits into groove 22a. Interaction of groove 22a and tongue 24b makes vertical displacement $s_y$ possible. On the other side of first carriage 24 (the side opposite to the one with tongue 24b) a groove 24a is provided in the x-direction. Tongue 26b is guided through said groove. A second carriage 26 is given tongue 26b. The other side of second carriage 26 comprises a rectangular recess 26a which serves to receive and hold image sensor 2. Interaction of groove 24a of first carriage 24 and of tongue 26b of second carriage 26 makes horizontal displacement $s_x$ possible.

Handling of a 5D camera can be performed in different ways which will be described in the following.

a) Automatic Inclination Mode

Movement in the three degrees of freedom of axial displacement ds, of horizontal inclination $a_x$ and of vertical inclination $a_y$ are performed on the basis of "trial and error", the aim being to increase the sharpness of the entire picture on image sensor 2. The focusing indicators for the control circuit are calculated on the basis of image data. Each of the above-mentioned degrees of freedom can be kept to a fixed value in order to speed up the optimization of focusing.

b) Relevant Region Mode

Three small regions (points) are marked in the viewfinder (optical or display) of the electronic camera. The above-mentioned degrees of freedom are used in order to optimize focusing within these regions.

The adjustment of the relevant region can be performed by means of a trackball which the user can actuate using his/her finger tip. An immediately adjacent sethead sets a marker. Adjustment to the next marker can be made using the trackball. When the shutter button is depressed, the process for determining the image sharpness starts. For each active marker, the process will select the axial displacement ds for which the sharpness is optimally adjusted. The microcomputer of the 5D camera calculates the shortest way for the electromechanical actuating means so that the above condition is fulfilled.

c) Gravitation Mode

In this instance it is assumed that the object lies within a vertical plane (architecture, rock climbing). The relevant region is automatically so determinated that good focusing is obtained over the entire plane. The three points determining the relevant region lie in a vertical plane.

The direction of gravity can also be used to control the vertical and/or horizontal displacement $s_x$ and $s_y$. Image sensor 2 automatically moves in a downward direction when the axis of the camera is inclined in an upward direction.

d) Continuous Focusing Mode

For pictures of stationary or barely moving objects it is possible to use the axial displacement ds in order to produce a series of images with different sharpness which can be used to produce a 3-dimensional image.

Conventional mathematical processes are employed to determine the sharpness indicators of the individual pixels of image sensor 2. The displacement parameters are calculated using the sharpness indicators and these data permit the image sensor to be brought into the desired imaging position.

The present invention has been described with reference to a preferred embodiment; however, it is obvious that a skilled person may make modifications in accordance with his capabilities without exceeding the scope of protection of the claims below.

What is claimed is:

1. An electronic camera for capturing a sharply focused image of an object, the electronic camera comprising:
   (a) a lens;
   (b) an image sensor movable in five degrees of freedom, such degrees of freedom including an axial displacement (ds) along the optical axis of the lens, a horizontal displacement (sx) parallel to an x-direction, a vertical displacement (sy) parallel to a y-direction, a horizontal inclination (ax) positioned relative to an x-y plane defined by the x- and y-directions, and a vertical inclination (ay) positioned relative to the x-y plane;

(c) means for selecting a plurality of object areas in an image of the scene;

(d) means for determining an axial displacement (ds) for each of the object areas which provides optimally adjusted sharpness of the focused image;

(e) means for calculating a set of ds, sx, sy, ax, and ay settings that simultaneously provide a sharply focused image for each of the plurality of object areas in the image; and (f) wherein the image is captured by the positioned image sensor using the calculated ds, sx, sy, ax, and ay settings.

2. Electronic camera according to claim 1, characterized in that the selected object area comprises at least three object areas which are bigger than one pixel of used image sensor (2).

3. Electronic camera according to claim 1, characterized in that image sensor (2) can be positioned in the axial displacement (ds), in the horizontal inclination ($a_x$) and in the vertical inclination ($a_y$) by means of at least three adjustment screws (10*a*, 10*b*, 10*c*).

4. Electronic camera according to claim 3, characterized in that positioning of image sensor (2) in the horizontal displacement $s_x$ can be performed with a first carriage (24) and positioning of the image sensor in the vertical displacement $s_y$ is performed with a second carriage (26), and in that said second carriage (26) has a rectangular recess (26*a*) in which image sensor (2) is secured.

5. Electronic camera according to claim 1, characterized in that the positioning means for image sensor (2) are electromechanical devices.

6. Electronic camera according to claim 1, characterized in that a trackball and an immediately adjacent sethead are provided for determining the at least two object areas so that the at least two selected object areas can be defined and the data transferred to a microcomputer.

7. A method for capturing a sharply focused image of an object, including the steps of:

(a) providing an electronic camera having a lens and an image sensor that can be moved in five degrees of freedom, including an axial displacement (ds) along the optical axis of the lens, a horizontal displacement sx parallel to the x-direction, a vertical displacement sy parallel to the y-direction, a horizontal inclination ax relative to the x-y plane, and a vertical inclination ay relative to the x-y plane;

(b) selecting a plurality of object areas in an image of the scene;

(c) determining an axial displacement (ds) for each of the plurality of object areas which provides optimally adjusted sharpness;

(d) calculating a set of ds, sx, sy, ax, ay settings that simultaneously provide a sharply focused image for each of the plurality of object areas in the image;

(e) adjusting the image sensor ds, sx, sy, ax, ay settings to match said calculated values; and (f) capturing a still image using said ds, sx, sy, ax, ay settings.

* * * * *